Patented Apr. 30, 1940

2,199,155

UNITED STATES PATENT OFFICE 2,199,155

MANUFACTURE OF MOLDED PRODUCTS

Alphonse Gams and Gustave Widmer, Basel Switzerland, assignors to firm of Ciba Products Corporation, Dover, Del.

No Drawing. Application July 30, 1935, Serial No. 33,912

10 Claims. (Cl. 18—55)

This invention relates to the manufacture of moldable products and molded shapes; and it comprises processes wherein certain infusible but substantially non-plastic synthetic resins, produced by condensing primary aromatic amines with formaldehyde bodies in the presence of acids, followed by an alkaline treatment, are rendered plastic and moldable; and it also comprises the shaped articles produced by the said processes; all as more fully hereinafter set forth and as claimed.

The present application is a continuation-in-part of our copending applications, Serial Numbers 245,038 and 245,039, filed January 6, 1928. As acknowledged in said copending applications, it is known that aniline and other primary aromatic amines are capable of reaction with formaldehyde or some other formaldehyde yielding product including polymers of formaldehyde to form quite a number of condensation products which may present widely differing properties, both chemical and physical, according to the particular conditions under which the reaction is carried. Thus for instance, if aniline is caused to act at a moderate temperature on formaldehyde in the presence of an alkaline or weakly acid condensing agent, or in the absence of such agent, anhydroformaldehyde aniline is obtained. If the reaction occurs at a higher temperature, there result brittle resinous fusible products of condensation, which are soluble in the customary solvents for resins and have been used as substitutes for the natural resins.

If the reaction is carried out in the presence of strong acids or the amino salts of such acids, the solutions will solidify, forming red colored gels which on being dried are converted either into insoluble, highly brittle, fairly transparent masses or crumble down, forming yellow to orange colored powders. These products are salts of the amine-formaldehyde condensation product and the respective acid.

It has been proposed to make synthetic resins by causing aromatic amines to react with formaldehyde in the presence of a strong mineral acid, until solid gels are formed, and treating the latter with agents adapted to neutralize the action of the acid. The process and product thus acknowledged are those described in the U. S. Patent No. 1,939,691 to applicants' colleagues, Haller & Kappeler, which also discloses the treatment of formaldehyde condensation products, for instance anhydroformaldehyde aniline, with formaldehyde in the presence of strong mineral acids and subsequent neutralization of the action of this acid to obtain similar products.

It has further been suggested to treat an aqueous solution of aniline hydrochloride with an excess, viz., more than the molecular proportion of formaldehyde and to precipitate the product of condensation by means of an alkali, before gelatinization has set in, the product thus obtained being an infusible amorphous powder, which hitherto has not been put to any practical use.

The present invention represents an improvement upon the process and product described by Haller et al. and, as acknowledged in our copending applications Ser. Nos. 245,038 and 245,039, the product of Haller et al. may serve as a raw material for the process of the present invention. The products according to this invention represent a valuable improvement in that they are dense, strong and lacking in porosity and are plastic in this sense that under the combined action of heat and pressure they can be molded and shaped similarly as the so-called thermoplastic masses which soften already when heated under atmospheric pressure.

Haller et al.'s process comprises the condensation of a formaldehyde yielding compound, such as formaldehyde itself, polymers of formaldehyde, and other compounds yielding formaldehyde, under the conditions of the condensation, with a primary aromatic amine, such as one selected from a class consisting of aniline, homologues of aniline, such as o-toluidine or a mixture of the various toluidines, further alpha- and beta-naphthylamine and other aromatic amines or mixtures of such amines with aniline. Haller et al. also state that condensation products of aromatic amines with formaldehyde compounds, such as anhydroformaldehyde-aniline, can be converted into the desired synthetic resins. The condensation reaction of Haller et al. takes place in the presence of a strong acid, for example a mineral acid such as hydrochloric, phosphoric, dilute sulfuric or nitric acid (under non-oxidizing conditions) or these salts can be employed in the combined form of the respective salts of the aromatic amines.

Preferably the acid should be present in approximately molecular proportions, calculated on the amine. However, there may be employed either somewhat less than 1 mol, for instance 0.8 mol or an excess of acid. If operating in a dilute reaction medium, more than 1 mol of the acid up to 2 or 3 mols should be present.

We have found that even organic acids, for example acetic and formic acid, may be used if employed in a considerable excess and preferably in absence of water.

The condensation reaction, being of an exothermic character, should not proceed at a high temperature. We prefer starting condensation at about 25° C. and causing it, for instance by suitable dilution, to come to an end at about 40° C. 100° C. should not be overstepped, since the products obtained at higher temperatures are less valuable. The reaction is appropriately carried out in the presence of a diluent or solvent such as water, organic solvents such as alcohol, acetone or the like or mixtures thereof.

The concentration of the solution under reaction plays a certain role insofar as a comparatively highly concentrated solution will also show a higher tendency to gelatinize. Therefore the concentration will have to be adapted to the products to be made and to the conditions of operation prevailing in each individual case. In the examples given hereinafter from 3 to 30 parts by weight water (including the water of formaldehyde solution and the water brought in with the acid) are present per 1 part aniline. If gelatinized solutions shall be converted into compressible powder, the reaction products are preferably comminuted before being treated with the alkali in order to facilitate elimination of the action of the acid.

The formaldehyde compound should be used in excess, that is for each mol of amine there should be present more than one mol of formaldehyde and approximately a molecular proportion of strong mineral acid.

Haller et al. mix aniline suspended in water, for example, with a suitable quantity of mineral acid and then add an aqueous solution of formaldehyde, maintaining the temperature between 40°–60° C. A red, colloidal solution is formed which may then be poured into molds and allowed to solidify, that is, to form a cast resin. After solidification the cast or formed product is treated with an alkali to eliminate the acid and this step is characteristic of the Haller et al. process. The alkaline treatment consists advantageously in washing or contacting the cast or formed product with an agent capable of eliminating the acid.

This elimination is effected preferably by means of a caustic alkali or an alkali carbonate or a caustic alkaline earth or carbonate, but ammonia and salts of basic reaction or a weak acid may also be used. Caustic soda and sodium carbonate, being soluble, are preferred.

In the absence of the characteristic alkaline treatment, the product obtained is a red, brittle and insoluble resin which easily disintegrates and is of no practical utility. Haller et al. obtain by the process described on the contrary resins which are toughly elastic and more or less porous, nontransparent, feebly colored masses. Their products are solid, tough, infusible masses which are insoluble in the usual resin solvents, and resistant against lyes and dilute acids, having a density varying within the limits of about 0.5 to 1 according to the conditions of the reaction. These products do not answer the description of being thermoplastic since they do not soften under atmospheric pressure even if heated up to the charring point.

We have now found that contrary to all expectations we may either shape directly the cast porous masses described in the specification of Letters Patent No. 1,939,691 or we may press these masses after comminution. Alternatively we may shape the amorphous powders obtained by precipitating the condensation product from its aqueous acid solution before a jelly has formed. In other words, we have found that these non-plastic products will become plastic when subjected to a suitable treatment.

That these products would be capable of being shaped was the more surprising as neither the bone-like masses obtainable according to Patent 1,939,691 nor the amorphous powders mentioned above, in view of their outer appearance and their infusibility and insolubility in all known solvents for resins give the impression of having this characteristic. As far as we are aware, this is the first instance of a non-plastic organic product, when subjected to the combined action of heat and pressure, being converted into a plastic product which, once so converted, can be molded and shaped by hot-pressing like any of the known thermoplastic compounds which however soften and are plastic already when heated under atmospheric pressure. Only after compression these masses became translucent and were found to possess resinous properties of a particular kind. It was further surprising to see that in this way pressed shapes of excellent mechanical properties could be obtained, in contradistinction to all other known condensation products from primary aromatic amines and formaldehyde, which are altogether unfit for the production of pressed shapes, since also those condensation products of this series, which present a resinous character, are absolutely unfit to be pressed in view of their brittleness and low melting point. Even if it had been possible to recognize the character of the infusible products, no expert in this particular art would have thought of investigating into the applicability of such infusible and insoluble products for the purposes of the industry of artificial resins, since this industry had altogether developed in the direction of the use of soluble resins, for instance of the phenol and urea type, which can be rendered insoluble and infusible by the combined action of heat and pressure.

That the products when subjected to the treatment according to this invention are suitable for use in the industry of artificial resins is due to their newly acquired plasticity, which we were the first to ascertain. None of the products manufactured, under the conditions described above, with more than 1 mol. formaldehyde per mol. aniline can be reduced to the molten state. The products obtainable with a small excess of formaldehyde, on being heated, sinter without melting, while already 1.5 mol. formaldehyde per mol. aniline result in a powder which, on being heated, is charred without visible sintering. However, all these products possess the property of becoming plastic and moldable, when subjected to a certain high pressure and temperature. In contradistinction to most of the artificial resins hitherto known, their properties and more especially their flowing capacity are not changed by hot-pressing. They are purely thermoplastic and the pressed shapes, on being comminuted, can be compressed once more under the same conditions.

The conditions under which these products can be compressed may vary within comparatively wide limits, according as it is desired to produce products compressed to the end or specifically lighter products, which are still more or less porous and non-transparent. Preferably the temperature during pressing should not be higher than required in order to render the products readily flowable, since there is no question of hardening them. According to the contents of formaldehyde in the products, pressing temperatures ranging between 140 and 200° C. have been found to be suitable, the pressures varying between 100 and 400 kgs. per square centimetre.

When starting from cast bone-like materials, as a rule the masses will only become denser without change of their outer shape. Here also the best conditions of pressure and temperature depend upon whether compression shall be continued up to the formation of transparent shapes or whether it will suffice to produce opaque, still finely porous shapes. Whether it is possible to increase the density of the masses, again depends from the plasticity, which cannot be predicted, of these apparently altogether rigid and inert bone-like masses. By this increase of density not only a very material increase of strength and resistivity against physical and chemical influences, but also a considerable improvement of the insulating power is obtained. Apart therefrom, our process renders it possible to obtain in a single operation exactly dimensioned shapes, in contradistinction to the process disclosed in U. S. Patent 1,939,691, which in view of the deformation to which the products may be subjected during drying, renders it necessary to ultimately subject the products to a mechanical finishing treatment. The process of the present invention is adapted to reduce all waste to a minimum.

The pressed shapes obtained from porous cast materials as well as those obtained from pulverulent condensation products can readily be machined and on being polished display a high gloss.

Regarding the manufacture of the condensation products to be shaped in accordance with the present process the following may be added:

We have found aniline to be the primary aromatic amine best suited for our purpose, but homologues of the aniline, such as for instance ortho-toluidine, meta-toluidine, meta-xylidine or amines comprising more than one nucleus, such as naphthylamines or mixtures of aniline with other primary aromatic amines can also be used with advantage.

The quantity of the formaldehyde may vary within wide limits according as products of higher flowing capacity or of higher softening point shall be produced. When using little more than 1 mol., for instance 1.1 mol. formaldehyde per 1 mol. aniline, products are obtained which are particularly well fitted to be pressed. If more formaldehyde is used, the products are not so readily compressible, but they are still more resistive against deformation at a higher temperature. While it is difficult to state the upper limit, we are in a position to say that as a rule it is unnecessary to use more than 2 mols. formaldehyde. The proportion of formaldehyde also influences to a high degree the mechanical properties of the shaped products. High mechanical strength, a fair resistivity to heat and fair molding capacity are shown for instance by compressed shapes produced from condensation products of 1 mol aniline and 1.2 mols. formaldehyde.

We may replace the formaldehyde by any substances which under the conditions of condensation split off formaldehyde, such as for instance paraformaldehyde, hexamethylenetetramine, and the like. The term "substances yielding formaldehyde" used in this specification and in the appended claims is intended to include also formaldehyde itself.

The properties of the products produced in our process are also influenced to a high degree by the temperature and duration of reaction. Preferably the temperature of condensation is maintained between 20° and 60° C. The most favorable duration depends from the temperature and should be longer at lower temperature than at higher temperatures. We have found it advantageous as a rule to neutralize the acid directly on the desired degree of condensation having been reached. As a rule this will be the case within an hour.

Instead of starting with the free primary amines and reacting them with more than the molecular quantity of formaldehyde, we may also start with the Schiff's bases, such as for instance anhydroformaldehyde aniline or anhydroformaldehyde meta-toluidine obtainable by reacting equimolecular quantities of primary aromatic amines and formaldehyde in neutral, basic or weakly acid solution. By treating these Schiff's bases with further quantities of formaldehyde in the presence of preferably about equimolecular quantities of strong mineral acids, we obtain the same infusible thermoplastic condensation products, as are obtained directly from primary aromatic amines and more than equimolecular quantities of formaldehyde in the presence of strong mineral acids. Here also either the gels described in Examples 1 or 5 of the specification of Letters Patent 1,939,691 can first be produced, which are then converted into the cast bone-like masses, which are either rendered plastic and molded or shaped by heat and pressure as such or after comminution. Or we may interrupt the condensation before a gel has been formed and we may then separate out the condensation product by the elimination of the acid under the form of the amorphous powder described above. This obvious modification of the process is intended to be included in the term "reacting one mol. of a primary aromatic amine with more than an equimolecular proportion of formaldehyde."

As shown in the foregoing description, the condensation products serving as starting materials for the compression are distinguished from all other synthetic resins, as regards their production, in that they are obtained in the form of an aqueous solution of the salts of a mineral acid. Thus the condensation of primary aromatic amines and formaldehyde, which serves for the recovery of the starting materials of our process, results in the first line in the formation of a salt of a basic condensation product, which, if the reaction mixture is sufficiently dilute, is obtained in aqueous colloidal solution, but forms a gel when the solutions are more concentrated. The treatment with agents for the elimination of the acid serves the purpose of separating out the insoluble and infusible basic condensation product and of eliminating the effect of the acid. Any chemical change of the resin base, such as a hardening of the compound, does not occur during this separation.

The new pressed shapes are not only distinguished by their high resistivity to mechanical and electrical stresses, but also by an absolute insensitivity to the action of alkalies and the customary resin solvents. A particularly important advantage, by which the new pressed shapes are distinguished from the phenolaldehyde condensation products, is their absolute freedom from any odor. According to the starting materials used and the conditions of production the pressed shapes are more or less transparent or opaque and more or less colored. At low pressures and temperatures there are obtained opaque, almost white colored products having a specific gravity varying between .5 and 1. At higher pressures and temperatures there are obtained transparent products having a specific gravity up to 1.2 or even higher.

If desired, these products, before being compressed, may be mixed with fillers, coloring matter or elastifying agents, including for instance cellulose, woodmeal, leather-meal, cork-meal, mica, heavy spar, asbestos, talc, nigrosin, indigo, eosin, phthalic ester, naphthalene, natural or synthetic resins, which may be fit to be hardened, etc. In this maner the properties and outer appearance of the products can be varied within wide limits.

The new products can be utilized for the most diverse purposes, for instance for insulating purposes, for the manufacture of articles of all kinds, as a material for parts of machinery, etc., which are subjected to comparatively strong mechanical stresses, such as for instance gear wheels, parts of textile machinery such as bobbins, shuttles, etc., further as packing material, as substitute for wood in the manufacture of furniture, etc., for the production of gramophone records, loud-speakers and other products of the acoustic industry.

The masses obtained when subjecting the products of reaction described by Haller et al. in their Patent No. 1,939,691 to the plastifying treatment according to this invention, as well as the articles obtained by molding and shaping these masses are quite particularly distinguished over other plastic masses by their mechanical and electrical properties which have been found to be superior to the properties of all other hot pressed masses hitherto known. The tensile strength of the molded masses ranges between 600 and 700 kgs./cm.$^2$, their transverse strength between 1000 and 1200 kgs./cm.$^2$, their impact strength between 15 and 20 cmkgs./cm.$^2$. The latter figures are particularly remarkable in view of the comparatively low impact strength of the known phenoplasts and aminoplasts. It has especially been found that the average figures are rather high whereas in the case of other products some figures are fairly high while others are remarkably low thus lowering the average level.

The new products possess high electric strength and are not liable to "tracking," so that in view of their great resistance to heat these products are particularly fit for use as electrical insulating material, the electrical properties of which approach those of shellac-bonded material.

The invention may be illustrated by reference to the following specific examples which represent practical embodiments thereof:

Example 1

93 kilos of aniline (1 mol.) are mixed with 93 litres hydrochloric acid of about 36 per cent. strength (about 1.1 mol.) and 930 litres water. There are then added 150 litres formaldehyde of 40 per cent. strength (2 mols.) and the mixture, as soon as it has become orange to red, is stirred into 2000 litres caustic soda of 5 per cent. strength. There is precipitated a white to feebly reddish, voluminous powder which is well washed to remove excess of formaldehyde and electrolytes. The separation of the last traces of electrolyte may be secured by electroosmosis. The powder obtained is dried and subjected to the combined action of heat and pressure to render it plastic. If the pressure used amounts to 160 kilograms per square centimetre and the temperature is about 150° C. there is obtained a quite clear yellowish to feebly brown-yellow press-cake, the specific gravity of which is about 1.2.

If the powder is subjected to pressure at a lower temperature, for example 100° C., there is obtained, particularly when the pressure used is low, such as 30–50 atmospheres, a yellowish opaque product, the specific gravity of which is only about 0.7. By compressing in the cold, at for example 160 kilograms per square cm., there is produced a solid opaque mass which can be removed from the mold and then rendered plastic by subsequent treatment at a raised temperature.

Example 2

100 parts of weight of anhydroformaldehyde aniline are suspended in 100 to 150 parts of water. 180 parts hydrochloric acid of 25 per cent. strength (1.2 mols.) and 75 parts by volume formaldehyde of 40 per cent. strength (1 mol.) are added and the mixture is heated in the water bath until a red colloidal solution has formed, which is then cast in a mold. When the main reaction has been completed, the whole is maintained at a moderate temperature by heating. A gel is formed which soon becomes turbid and after some time solidifies with the major part of the solvent, whereupon it can be withdrawn from the mold. By treating these molded shapes with caustic soda solution of 3 to 10 per cent. strength they are converted into a solid yellowish slightly elastic mass which is washed and dried by heating to beyond 100° C. This mass if subjected to a pressure of 400 kgs. per square centimetre at a temperature of 200° C. is converted into a transparent pressed shape.

Example 3

100 litres of aniline (about 1.12 mols.), 175 litres of water and 105 litres of hydrochloric acid of 42 per cent. strength (about 1.2 mols.) are mixed together and cooled to about 8° C. There are added to the mixture 150 litres of formaldehyde of 40 per cent. strength (2 mols.) which is also cooled. The mixture now remains until the formation of a solid red gel. This product is allowed to rest ½ hour and then comminuted and washed with alkali until the powder is white. It is then thoroughly washed with water and dried. The powder thus produced if subjected at 150° C. to a pressure of 160 kilograms per square centimetre for about 1½ hours, is converted into a very solid opaque to translucent mass of yellowish color and specific gravity of about 0.95 is obtained. The mode of operation may be varied within wide limits. For instance the gelatinized mass may be treated with alkali first and subsequently comminuted.

Example 4

93 grams of aniline (1 mol.) are mixed with 135 cc. of water and 100 cc. of hydrochloric acid of 40 per cent. strength and the mixture is cooled to about 10–20° C. 140 cc. of formaldehyde of 40 per cent. strength (1.87 mols.) are then added and well intermixed, whereupon the whole is poured quickly into molds. The mixture becomes hot and soon solidifies. After standing for some time the mass is introduced into dilute caustic soda solution (about 3 per cent. strength) until the red color has completely disappeared. It is then washed with water and dried at about 40–60° C. The solid piece thus obtained, for instance a plate, is subjected at a temperature of 150° C. to 100 kilograms pressure for about 1 hour whereby its specific gravity is raised from 0.6 to about 1 and the capacity for insulation is increased. By using still higher pressures products of still higher specific gravity can be obtained.

Example 5

In a solution of 125 parts by volume of phosphoric acid in 1000 parts of water there are dissolved, while stirring well, 93 parts by weight of aniline (1 mol.). To this solution 90 parts by volume of formaldehyde of 40 per cent. strength (1.2 mols.) are then quickly added at 28° C. The temperature rises to 40° C. After 17 minutes the red condensation solution is introduced, while stirring, into a solution of 120 parts by weight of caustic soda in 2000 parts of water. A white precipitate is separated which is filtered, washed and dried. The powder on being subjected at 150° C. to a pressure of 150 kgs./cm². can be converted into transparent moldings of excellent mechanical strength.

Example 6

107 parts by weight of m-toluidine (1 mol.) are dissolved in 200 parts by weight of concentrated sulfuric acid (about 2 mols.) in 1000 parts of water and mixed at 40° C. with 98 parts by volume of formaldehyde of 40 per cent. strength (1.3 mols.). The temperature rises to 48° C. After 7 minutes the whole is adjusted weakly alkaline by means of caustic soda solution and the precipitate filtered off, washed and dried. The powder may be molded and shaped by heat and pressure in an analogous manner as the product obtained according to Example 5.

Example 7

1 molecular proportion of aniline is dissolved in a solution of 1 molecular proportion of concentrated hydrochloric acid in 800 ccm of water, wherupon 1.5 molecular proportions of formaldehyde solution are added. The mixture is kept at 40° C. for 20 minutes; if during this time it begins to become viscous, further 700 ccm of water are added in order to prevent gelatinization. The resin is then precipitated by addition of dilute caustic soda solution and the precipitate filtered, washed and dried as usual. When subjected to a pressure of 200 kgs./cm². at 170° C., there are obtained very heat-resistant, transparent shapes of great mechanical strength.

Example 8

93 parts by weight of aniline (1 mol.) are dissolved in 3000 parts of water and 165 parts by volume of concentrated hydrochloric acid (2 mols.) and 225 parts by volume of formaldehyde of 40 per cent. strength (3 mols.) added thereto at 22° C. The temperature rises to 30° C. After about 20 minutes the acid is neutralized with sodium carbonate solution and the precipitated resin washed, filtered and dried. When subjected to a pressure of 200 kgs./cm². at 170° C., there are obtained excellent translucent shapes.

Example 9

84 parts by weight of aniline (0.9 mol.) and 14.6 parts by weight of α-naphthylamine (0.1 mol.) are dissolved by heating in 900 parts of water and 90 parts by volume of hydrochloric acid of 40 per cent. strength, adding then to this solution after cooling down to 44° C. 100 parts by volume of a formaldehyde solution of 40 per cent. strength (about 1.3 mols.). The temperature rises to 55° C. After 5 minutes the whole is neutralized, filtered, washed and dried. The reddish powder, when subjected to a pressure of 150 kgs./cm². at 145° C., may be molded to translucent shapes.

Example 10

93 parts by weight of aniline (1 mol.) are dissolved in 103 parts by weight of hydrochloric acid of 35.4 per cent. strength (1 mol.) which are diluted with 800 parts of water. Into this solution having a temperature of 25° C. are introduced 98 parts by weight of aqueous formaldehyde of 36.8 per cent. strength (1.2 mols.). After a few minutes the clear reaction solution becomes deep red and the temperature rises to about 40° C.; this solution is then introduced, after the reaction having been kept for ¼ hour, into a solution of 41 parts by weight of sodium hydroxide (1.2 mols.) in 1000 parts of water. A flesh-colored, flocculent precipitate is thus separated which by repeated sedimentation is washed free from salt and dried in a vacuum drying chamber at about 80° C. The product obtained is ground and yields a bright yellow powder which, when subjected to a pressure of 150 kgs./cm². at 150° C. may be molded to solid shapes.

Various changes may be made in the details disclosed in the foregoing specification without departing from the invention or sacrificing the advantages thereof.

What we claim is:

1. An odorless transparent infusible hot-pressed article, resistive to the action of alkaline compounds and of orange to reddish brown color, possessing toughness, high mechanical strength and electrical insulating power, said shaped article being composed of the acid-free product of the condensation of one molecular proportion of a primary aromatic amine with substantially 1.2 molecular proportions of a formaldehyde yielding compound in the presence of substantially one molecular proportion of a strong mineral acid.

2. An odorless transparent infusible hot-pressed article, resistive to the action of alkaline compounds and of orange to reddish brown color, possessing toughness, high mechanical strength and electrical insulating power, said shaped article being composed of the acid-free product of the condensation of one molecular proportion of aniline with substantially 1.2 molecular proportions of formaldehyde in the presence of substantially one molecular proportion of hydrochloric acid.

3. The process which comprises condensing one molecular proportion of primary aromatic amine with about 1-2 molecular proportions of a formaldehyde yielding compound in the presence of about 0.8 to 3 molecular proportions of a strong mineral acid, treating the resultant condensation product with an agent which substantially eliminates the effect of the acid, and heating the resultant product in a mold at a pressure ranging from about 100 to 400 kilograms per square centimeter to a temperature ranging from about 140 to 200° C., thereby producing an odorless, strong, dense, non-porous shaped article which is permanently thermoplastic at said pressure and temperature ranges.

4. The process of claim 3, wherein the aromatic amine is aniline and the formaldehyde yielding compound is formaldehyde.

5. The process which comprises condensing one molecular proportion of a primary aromatic amine with about 1.2 molecular proportions of a formaldehyde yielding compound in the presence of about 0.8 to 3 molecular proportions of a strong mineral acid, treating the resultant condensation product with an agent which substantially eliminates the effect of the acid, and heating the resultant product in a mold at a pressure ranging from about 100 to 400 kilograms per square centimeter to a temperature ranging from about 140 to 200° C., thereby producing an odorless, strong, dense, non-porous shaped article which is permanently thermoplastic at said pressure and temperature ranges.

6. The process of claim 5, wherein the aromatic amine is aniline, the formaldehyde yielding product is formaldehyde, and the strong mineral acid is hydrochloric acid.

7. The process which comprises condensing one molecular proportion of primary aromatic amine with about 1-2 molecular proportions of a formaldehyde yielding compound in the presence of about 0.8 to 3 molecular proportions of a strong mineral acid, allowing the resultant mass to gelatinize to form a solid gel, treating the latter with an agent which substantially eliminates the effect of the acid, and directly heating the acid-free gel in a mold at a pressure ranging from about 100 to 400 kilograms per square centimeter and at a temperature ranging from about 140 to 200° C., thereby producing an odorless, strong, dense, non-porous shaped article which is permanently thermoplastic at said pressure and temperature ranges.

8. The process which comprises condensing one molecular proportion of primary aromatic amine with about 1-2 molecular proportions of a formaldehyde yielding compound in the presence of about 0.8 to 3 molecular proportions of a strong mineral acid, allowing the resultant mass to gelatinize to form a solid gel, treating the latter with an agent which substantially eliminates the effect of the acid, comminuting the said solid gel to powder form, and then heating the acid-free powder in a mold at a pressure ranging from about 100 to 400 kilograms per square centimeter and at a temperature ranging from about 140 to 200° C., thereby producing an odorless, strong, dense, non-porous shaped article which is permanently thermoplastic at said pressure and temperature ranges.

9. The process which comprises condensing one molecular proportion of primary aromatic amine with 1-2 molecular proportions of a formaldehyde yielding compound in the presence of about 0.8 to 3 molecular proportions of a strong mineral acid, precipitating the condensation product in the form of an infusible amorphous powder by treating the reaction mass, before gelatinization thereof has set in, with an alkali, and heating the resulting substantially acid-free powder in a mold at a pressure ranging from about 100 to 400 kilograms per square centimeter and at a temperature ranging from about 140 to 200° C., thereby producing an odorless, strong, dense, non-porous shaped article which is permanently thermoplastic at said pressure and temperature ranges.

10. A hot-pressed article composed of the acid-free product of the condensation of a primary aromatic amine with more than one mol of a formaldehyde yielding compound in the presence of an acid.

ALPHONSE GAMS.
GUSTAVE WIDMER.